US012328362B2

(12) United States Patent
Das et al.

(10) Patent No.: US 12,328,362 B2
(45) Date of Patent: Jun. 10, 2025

(54) SYSTEMS AND METHODS FOR MAINTAINING A DISTRIBUTED CLOUD SPECTRUM ACCESS SYSTEM

(71) Applicant: Federated Wireless, Inc., Arlington, VA (US)

(72) Inventors: Deepak Das, Lexington, MA (US); Sepehr Mehrabanzad, Wellesley, MA (US); Sushant Parkhi, Melrose, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 101 days.

(21) Appl. No.: 17/176,701

(22) Filed: Feb. 16, 2021

(65) Prior Publication Data

US 2021/0258848 A1    Aug. 19, 2021

Related U.S. Application Data

(60) Provisional application No. 62/976,204, filed on Feb. 13, 2020.

(51) Int. Cl.
*H04L 67/1008*   (2022.01)
*H04L 67/1034*   (2022.01)
*H04L 67/1095*   (2022.01)
*H04W 48/18*     (2009.01)

(52) U.S. Cl.
CPC ...... *H04L 67/1095* (2013.01); *H04L 67/1008* (2013.01); *H04L 67/1034* (2013.01); *H04W 48/18* (2013.01)

(58) Field of Classification Search
CPC ............... H04W 36/165; H04W 48/18; H04L 67/1008; H04L 67/1034; H04L 67/1095
See application file for complete search history.

(56) References Cited

U.S. PATENT DOCUMENTS

| | | | |
|---|---|---|---|
| 2017/0235808 A1* | 8/2017 | Salame | H04L 67/565 707/625 |
| 2019/0159176 A1* | 5/2019 | Barton | H04W 72/04 |
| 2019/0320494 A1* | 10/2019 | Jayawardene | H04L 12/2803 |
| 2021/0243651 A1* | 8/2021 | Syed | H04W 28/0247 |
| 2021/0352488 A1* | 11/2021 | Khawer | H04W 76/18 |
| 2022/0150752 A1* | 5/2022 | Balasubramanian | H04W 24/04 |

* cited by examiner

*Primary Examiner* — Ryan J Jakovac
(74) *Attorney, Agent, or Firm* — Finnegan, Henderson, Farabow, Garrett & Dunner, LLP

(57) ABSTRACT

A cloud-based system for maintaining a distributed cloud spectrum access system (SAS) is disclosed. The system may include one or more processors; and a memory storing instructions that cause the one or more processors to perform the a method including: syncing one or more edge databases at a frontend-SAS with corresponding cloud databases at a backend-SAS; monitoring a connection between the frontend-SAS and the backend-SAS; determining the connection between the frontend-SAS and the backend-SAS has been severed; continuing to operate within an interference headroom; attempting one or more robustness mechanisms to ensure impact to the frontend-SAS is minimized and to reestablish the connection between the frontend-SAS and the backend-SAS; and upon determining the connection is reestablished, reconciling the one or more edge databases at the frontend-SAS with the corresponding cloud databases at the backend-SAS.

37 Claims, 4 Drawing Sheets

SYSTEMS AND METHODS FOR MAINTAINING A DISTRIBUTED CLOUD SPECTRUM ACCESS SYSTEM

CROSS-REFERENCE TO RELATED APPLICATIONS

This application claims the benefit of U.S. Provisional Application Ser. No. 62/976,204, filed on Feb. 13, 2020, the disclosure of which is hereby incorporated by reference in its entirety.

TECHNICAL FIELD

The present disclosure relates to inventive techniques for maintaining a distributed spectrum access system (SAS) and, more particularly, to cloud-based methods, systems, and computer-readable media for maintaining a distributed SAS deployed partly on a central server and partly on an edge server and splitting the SAS functionality between the central and edge servers in a meaningful way.

BACKGROUND

Radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party (i.e., cellular operator) receives one or more frequency assignments, in the form of a license, to operate a radio transmitter on specific frequency channels within a particular geographic location.

In view of an increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz band recently made available for commercial use in the United States. In another example, a DSA system may be used to share access to unlicensed spectrum, such as Television Whitespace (TVWS), the unassigned television channels. Coordinating and managing multi-user access to a shared spectrum present challenges in a DSA system.

As wireless demands grow, shared spectrum usage is becoming more common, e.g., in TVWS bands and in the 3.5 GHz Federal band. Conventional SAS are run as a central service, i.e., in one public cloud platform, such as Amazon Web Services (AWS). Running the SAS as a central service may not be the optimum approach to meet customer use-case requirements or to manage the cost and reliability of a spectrum allocation system. This conventional approach may cause issues including significant latencies in response time performance for protocol message exchanges between a user and the central server, security issues if the central server is compromised, reliability issues if the central server goes down, cost efficiency issues, and scaling issues. Therefore, there is a need for an improved SAS implementation that is highly scalable and reliable.

In these environments, a SAS may control spectrum access among users assigned to different priority levels (or "tiers") of spectrum-access privileges. The SAS may implement spectrum management policies for users in each tier. For example, the SAS may be configured to protect spectrum usage by higher-priority "primary users" in shared bands from harmful interference that would result from communications by lower-priority "secondary users." In some cases, such higher-priority primary users may comprise "incumbent" users, such as military or other government users, that had access to a spectrum before that spectrum was shared with other "non-incumbent" or lower-priority secondary users. As used herein, a "user" may refer to a user equipment (such as a mobile phone) or a person using a user equipment as will be apparent in context. In many cases where there are relatively few primary users, spectrum usage by primary users is low, so secondary users can dominate overall resource usage. Nonetheless, in regions with primary users, the SAS should ensure that any spectrum allocations to secondary users will not create unacceptable levels of interference with the primary users. Therefore, in order to allocate spectrum to potentially millions of secondary users in the presence of potentially millions of primary users, there is a need for an improved SAS implementation that is highly scalable and reliable.

SUMMARY

One aspect of the present disclosure is directed to a cloud-based system for maintaining a distributed cloud spectrum access system (SAS). The system may comprise one or more processors; and a memory storing instructions that, when executed by the one or more processors, cause the one or more processors to perform the steps comprising: syncing one or more edge databases at a frontend-SAS with corresponding cloud databases at a backend-SAS; monitoring a connection between the frontend-SAS and the backend-SAS; determining the connection between the frontend-SAS and the backend-SAS has been severed; continuing to operate within an interference headroom, wherein the interference headroom guarantees there is none to limited interference to dynamic incumbents; attempting one or more robustness mechanisms to ensure impact to the frontend-SAS is minimized and to reestablish the connection between the frontend-SAS and the backend-SAS; and upon determining the connection is reestablished, reconciling the one or more edge databases at the frontend-SAS with the corresponding cloud databases at the backend-SAS.

Another aspect of the present disclosure is directed to a cloud-based method for maintaining a distributed cloud spectrum access system (SAS). The method may comprise: syncing one or more edge databases at a frontend-SAS with corresponding cloud databases at a backend-SAS; monitoring a connection between the frontend-SAS and the backend-SAS; determining the connection between the frontend-SAS and the backend-SAS has been severed; continuing to operate within an interference headroom, wherein the interference headroom guarantees there is none to limited interference to dynamic incumbents; attempting one or more robustness mechanisms to ensure impact to the frontend-SAS is minimized and to reestablish the connection between the frontend-SAS and the backend-SAS; and upon determining the connection is reestablished, reconciling the one or more edge databases at the frontend-SAS with the corresponding cloud databases at the backend-SAS.

Yet another aspect of the present disclosure is directed to a non-transitory computer-readable medium embodying program code for maintaining a distributed cloud spectrum access system (SAS). The program code may comprise a set of instructions, stored on the computer readable medium, that when executed by a processor, may cause the processor to perform the operations of: syncing one or more edge databases at a frontend-SAS with corresponding cloud databases at a backend-SAS; monitoring a connection between the frontend-SAS and the backend-SAS; determining the connection between the frontend-SAS and the backend-SAS has been severed; continuing to operate within an interference headroom, wherein the interference headroom guarantees there is none to limited interference to dynamic incumbents; attempting one or more robustness mechanisms to ensure impact to the frontend-SAS is minimized and to reestablish the connection between the frontend-SAS and the backend-SAS; and upon determining the connection is reestablished, reconciling the one or more edge databases at the frontend-SAS with the corresponding cloud databases at the backend-SAS.

BRIEF DESCRIPTION OF THE DRAWINGS

The accompanying drawings, which are incorporated in and constitute a part of this disclosure, illustrate various exemplary disclosed embodiments. In the drawings.

DETAILED DESCRIPTION OF DISCLOSED EMBODIMENTS

Figure 1:
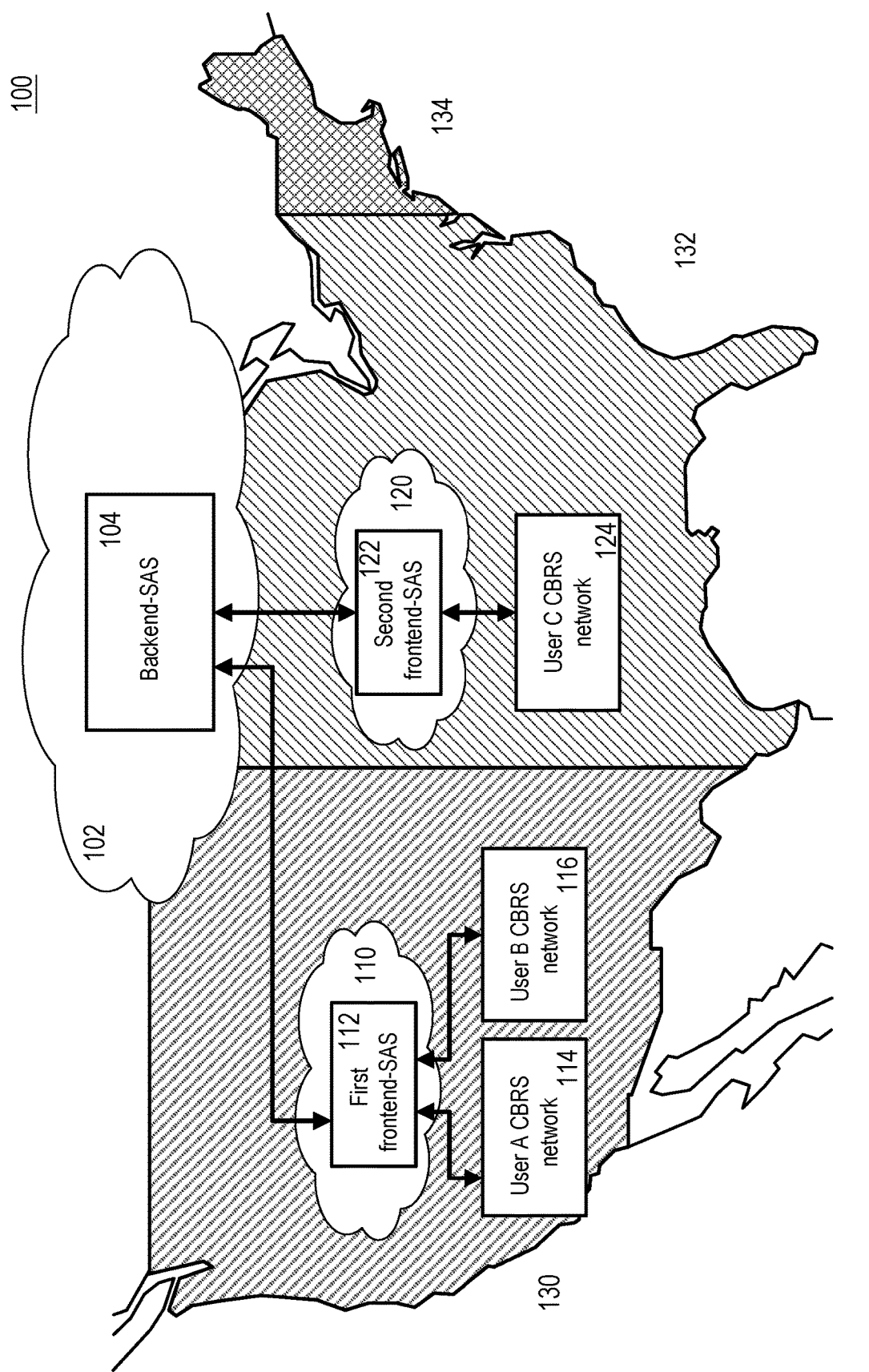
FIG. 1 depicts a schematic diagram illustrating an exemplary distributed hybrid cloud-based SAS, consistent with disclosed embodiments.

The following detailed description refers to the accompanying drawings.

Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 depicts a schematic diagram illustrating an exemplary distributed hybrid cloud-based SAS 100 in accordance with certain disclosed embodiments. Distributed SAS 100 may comprise a variety of computerized and cloud-based systems, each of which may be connected to each other via one or more networks. In some embodiments, each of the elements depicted in FIG. 1 may represent a group of systems, individual systems in a network of systems, functional units or modules inside a system, or any combination thereof. The individual systems may also be located within one geographical location or be geographically dispersed.

In some embodiments, the depicted systems may include a public cloud 102, a backend-SAS 104, a first edge cloud 110, a first frontend-SAS 112, a user A network 114, a user B network 116, a second edge cloud 120, a second frontend-SAS 122, a user C network 124, a first region 130, a second region 132, and a third region 134. While only two first and second frontend-SASs 112 and 122 and one backend-SAS 104 are depicted in FIG. 1, the number is only exemplary and fewer or additional frontend-SAS and backend-SAS may be implemented.

Each system depicted in FIG. 1 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

In some embodiments, public cloud 102 may be a centralized cloud provided by, for example, Amazon Web Services (AWS), Microsoft Azure, Google Cloud Platform, Alibaba Cloud, IBM Cloud, Oracle Cloud, or any other public cloud provider, and may be configured to deploy backend-SAS 104.

Backend-SAS 104, in some embodiments, may include one or more cloud-based processors with access to mapping databases. Mapping databases may include information associated with each region and/or information associated with each user, such as a Citizens Broadband Service Device (CBSD), operating in or near each region. For example, the mapping databases may include information associated with first region 130, second region 132, third region 134, user A network 114, user B network 116, and user C network 118. Backend-SAS 104 may be implemented on public cloud 102 or a central datacenter and may be configured to perform the common activities needed to support first and second frontend-SASs 112 and 122 and the networks connected to them, as discussed in greater detail below with respect to FIG. 2. Backend-SAS 104 may also be configured to route requests to an appropriate destination and ensure the correct data is available at an appropriate location for the SAS to execute correctly and in a timely manner all its functions, as discussed in greater detail below. In other embodiments, backend-SAS 104 may also include a capability to provide full monitoring and analytics of distributed hybrid cloud-based SAS 100.

In some embodiments, to ensure reliability of system 100, backend-SAS 104 may include one or more redundant processors and databases. Accordingly, if one processor associated with backend-SAS 104 fails, backend-SAS 104 may switch to another redundant processor and use the redundant, backup processor. Additionally or alternatively, one or more copies of a database associated with backend- SAS 104 may be maintained such that if a primary database becomes corrupted or lost, backend-SAS 104 may switch to and use a backup database.

In this disclosure, "backend-SAS" may refer to SAS-related functionality which is compatible with a public or centralized cloud, such as public cloud 102, while "frontend-SAS" may refer to SAS-related functionality which is compatible with an edge cloud, such as first edge cloud 110 or second edge cloud 120. The use of "frontend" and "backend" stems from the notion that for some functionality, a CBSD may interact directly with the "frontend-SAS," and as needed, the "frontend-SAS" may collaborate with the "backend-SAS" to accomplish the tasks needed for successful completion of the CBSD interaction. Furthermore, throughout the disclosure, the terms "backend-SAS" and "cloud SAS," as well as "frontend-SAS" and "edge SAS" may be used interchangeably.

First edge cloud 110, in some embodiments, may consist of a combination of Infrastructure as a Service (IaaS), such as from Packet Communications, Vapor, AWS, Microsoft Azure, Google Cloud Platform, Alibaba Cloud, IBM Cloud, Oracle Cloud, or any other IaaS providers, running on leveraging infrastructure, such as computers, networks, storage, real estate, power, AC, at the base of a cell tower or in a warehouse, provided by companies such as SBA communications, Crown Castle, American Tower, or any other cell tower or real-estate company operating communications infrastructure. First edge cloud 110, consistent with disclosed embodiments, may be configured to deploy first frontend-SAS 112. Alternatively, first frontend-SAS 112 may be deployed on an edge datacenter.

First frontend-SAS 112, in some embodiments, may include one or more cloud-based processors with access to mapping databases. For example, the mapping databases first frontend-SAS 112 has access to may include information associated with first region 130, user A network 114 and user B network 116. In some embodiments, to ensure reliability of system 100, first frontend-SAS 112 may include one or more redundant processors and databases. Accordingly, if one processor associated with first frontend-SAS 112 fails, first frontend-SAS 112 may switch to another redundant processor and use the redundant, backup processor. Additionally or alternatively, one or more copies of a database associated with first frontend-SAS 112 may be maintained such that if a primary database becomes corrupted or lost, first frontend-SAS 112 may switch to and use a backup database. In other embodiments, one or more copies of a database associated with first frontend-SAS 112 may be stored in backend-SAS 104 such that if a primary database becomes corrupted or lost, backend-SAS 104 may be able to restore the corrupted or lost primary database.

In some embodiments, first and second frontend-SASs 112 and 122 may be configured to contain as much of the SAS functionality as possible, such as the protocol handling service with a device. This may improve latencies in response time performance for protocol message exchanges by alleviating as much as possible the additional delays due to messages going back and forth over the public Internet between a user's network and a centralized SAS. Further, this may also serve to isolate as much as possible the SAS functionality for individual users. Being able to deploy the SAS functionality more flexibly per user as needed at the frontend may result in a better user experience. For example, every frontend-SAS may potentially run different SAS versions that are compatible with the common backend-SAS 104. As another example, targeted monitoring dashboards, alerts, and other features may be created to fit individual users' needs. Further still, being able to isolate as much as possible the SAS functionality for individual users may allow for handling scaling needs in a more targeted manner per user at the frontend, close to the user network. In other embodiments, first and second frontend-SASs may be internal to a private network and may support both public and private SASs.

User A network 114 and user B network 116, in some embodiments, may represent a user A and a user B who may wish to connect their network to a frontend-SAS. For example, user A network 114 and user B network 116 may be connected to first frontend-SAS 112 due to their proximity to this frontend-SAS. Additionally, first frontend-SAS 112 may support tailoring SAS functionality to each user, meaning user A network 114 and user B network 116 may employ different versions of SAS functionality supported by first frontend-SAS 112. As another example, user A network 114 may be private and user B network 116 may be public, and first frontend-SAS 112 may run simultaneous public and private SAS service to support both networks.

Similarly, second edge cloud 120, in some embodiments, may consist of a combination of Infrastructure as a Service (IaaS), such as from Packet Communications, Vapor, AWS, Microsoft Azure, Google Cloud Platform, Alibaba Cloud, IBM Cloud, Oracle Cloud, or any other IaaS providers, running on infrastructure provided by a cell tower or real-estate company, such as SBA communications, Crown Castle, American Tower, or any other cell tower or real-estate company operating communications infrastructure. Second edge cloud 120, consistent with disclosed embodiments, may be configured to deploy second frontend-SAS 122.

Second frontend-SAS 122, in some embodiments, may include one or more cloud-based processors with access to mapping databases. For example, the mapping databases second frontend-SAS 122 has access to may include information associated with second region 132 and user C network 124. In some embodiments, to ensure reliability of system 100, second frontend-SAS 122 may include one or more redundant processors and databases. Accordingly, if one processor associated with second frontend-SAS 122 fails, second frontend-SAS 122 may switch to another redundant processor and use the redundant, backup processor. Additionally or alternatively, one or more copies of a database associated with second frontend-SAS 122 may be maintained such that if a primary database becomes corrupted or lost, second frontend-SAS 122 may switch to and use a backup database. In other embodiments, one or more copies of a database associated with second frontend-SAS 122 may be stored in backend-SAS 104 such that if a primary database becomes corrupted or lost, backend-SAS 104 may be able to restore the corrupted or lost primary database.

User C network 124, in some embodiments, may represent a user C who may wish to connect their network to a frontend-SAS. For example, user C network 124 may be connected to second frontend-SAS 122 due to their proximity to this frontend-SAS.

In some embodiments, first and second frontend-SASs 112 and 122 may be configured to allow user device networks (e.g., user A network 114, user B network 116, and user C network 124) to connect to the nearest, most convenient frontend-SAS to access the SAS service via appropriate DNS routing. Consistent with disclosed embodiments, the user device networks may be unaware of the split between the frontend-SAS and the backend-SAS. First and second frontend-SASs 112 and 122 may be configured to perform one or more functions from a list including, but not limited to, terminating "daytime" SAS protocol exchanges, i.e., the real-time exchanges with devices at the edge; routing requests, primarily of a non-real-time nature, over an interface to backend-SAS 104; supporting flexible criteria for routing requests from frontend-SAS 112 or 122 to backend-SAS 104; handling alternate channel allocation upon Dynamic Protection Area (DPA) activation when there is urgency to seamlessly move CBSDs to an alternate channel when DPA is activated on specific channels; maintaining a relevant mapping to backend data related to the networks connected to frontend-SAS 112 or 122, being able to access such data as needed.

Supporting flexible criteria for routing requests may include requests which are non-real-time requests pertaining to message protocol related exchanges with devices or other requests from frontend-SAS 112 or 122 to backend-SAS 104 for other functionality. The routing of such requests may require delivering the requests to an appropriate service in backend-SAS 104 based on different criteria, not necessarily based on the physical location of any incumbents in the band. Such routing criteria may be based on the location of devices, loading levels on backend-SAS 104 blocks, health of backend-SAS 104, and any other appropriate basis for determining where to route a request.

In some embodiments, backend-SAS 104 may be configured to perform one or more functions from a list including, but not limited to, handling requests from first and second frontend-SASs 112 and 122 for either protocol-related non-real-time functionality or other functionality; routing responses back to first and second frontend-SASs 112 and 122; discovering and securely connecting to first and second frontend-SASs 112 and 122; maintaining data (e.g., protocol-related data, analytics, region-related data, user-related data) for first and second frontend-SASs 112 and 122 with clear demarcation as needed; handling rerouting messages and providing robustness in case a frontend-SAS becomes unavailable, this may include, but is not limited to, storing the present state to enable seamless restoration of service to the devices when the impacted frontend-SAS becomes available.

Figure 2:
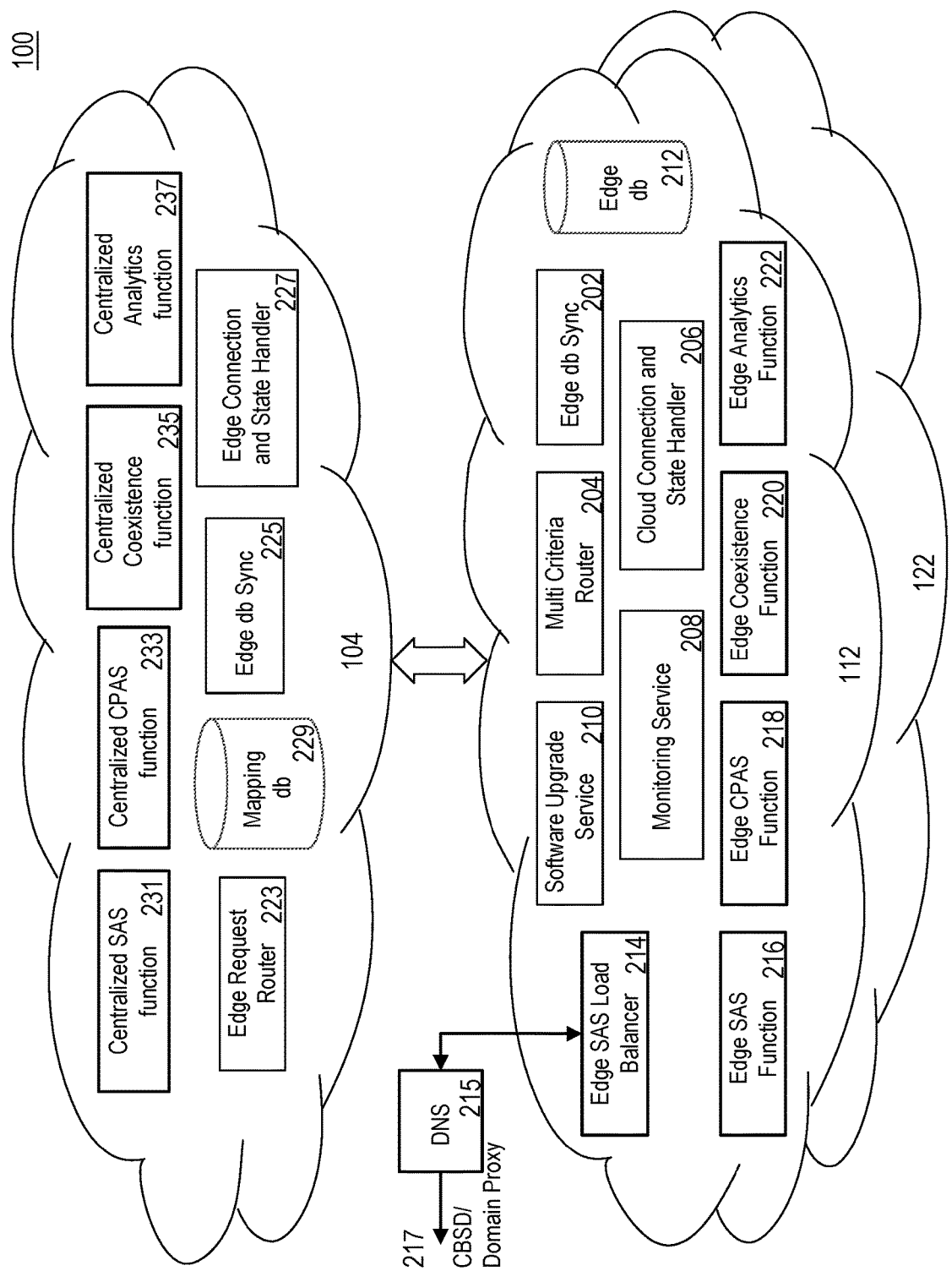
FIG. 2 depicts a schematic diagram of an exemplary distributed SAS leveraging a hybrid cloud deployment illustrating a backend-SAS interacting with two frontend-SAS, consistent with disclosed embodiments.

FIG. 2 depicts a schematic diagram of an exemplary distributed SAS 100 leveraging a hybrid cloud deployment illustrating backend-SAS 104 interacting with first and second frontend-SASs 112 and 122, in accordance with certain disclosed embodiments. In some embodiments, each of the elements depicted in FIG. 1 may represent a group of systems, individual systems in a network of systems, functional units or modules inside a system, or any combination thereof. The individual systems may also be located within one geographical location or be geographically dispersed.

In some embodiments, the depicted elements may include backend-SAS 104, first frontend-SAS 112, second frontend-SAS 122, frontend edge db sync 202, multi criteria router 204, cloud connection and state handler 206, monitoring service 208, software upgrade service 210, edge db 212, edge SAS load balancer 214, DNS 215, edge SAS function 216, CBSD/Domain Proxy 217, edge CPAS function 218, edge coexistence function 220, edge analytics function 222, edge request router 223, backend edge db sync 225, edge connection and state handler 227, mapping db 229, centralized SAS function 231, centralized CPAS function 233, centralized coexistence function 235, centralized analytics function 237. While only two first and second frontend-SASs 112 and 122 and one backend-SAS 104 are depicted in FIG. 2, the number is only exemplary and fewer or additional frontend-SAS and backend-SAS may be implemented. Similarly, backend-SAS 104 and first and second frontend-SASs 112 and 122 are not limited to the services and functions depicted in FIG. 2 and may include any combination of the services and functions depicted and other appropriate services and functions not depicted.

Frontend edge db sync 202 may be included in first frontend-SAS 112 and may refer to the service responsible for syncing databases at edge cloud 110 with those in public cloud 102. The data that may need to be synchronized may include, but is not limited to, information pertaining to incumbents protected by the SAS, available backend-SAS 104 blocks, move list for DPA operations, alternate channels (to be allocated to CBSDs in the event of DPA activation), and other data for which it may be beneficial for a copy to exist in backend-SAS 104. Ensuring the above-identified data at edge cloud 110 and public cloud 102 are synchronized may make certain that first frontend-SAS 112 and backend-SAS 104 are working with information that are consistent at any time.

Multi criteria router 204 may be included in first frontend-SAS 112 and may refer to the service responsible for routing requests asynchronously using protocols to the most appropriate backend-SAS 104 block in public cloud 102. Multi criteria router 204 may evaluate different criteria and use a meaningful combination of such criteria to decide which backend-SAS 104 block to route requests to, from first frontend-SAS 112. The criteria for such routing may include, but is not limited to, CBSD-to-incumbent mapping; closest backend-SAS 104 block in terms of geographical distance or network distance; backend-SAS 104 block that is least loaded; and backend-SAS 104 block that may have an extended capability that other backend-SAS 104 blocks do not have. An extended capability may refer to advanced planning services, tighter integration with a packet core or connectivity services, 5G-oriented capabilities to address 5G features such as Massive MIMO, New Radio, or other features, and any other capability which may provide a backend-SAS 104 block with additional functionality when compared to another block.

Cloud connection and state handler 206 may be included in first frontend-SAS 112 and may refer to the service responsible for ensuring robust and reliable connectivity for first frontend-SAS 112 to backend-SAS 104. In case there may be a connectivity issue, this service may include re-try and other standard robustness mechanisms to ensure that impact to first frontend-SAS 112 functionality is minimized. In some embodiments, first frontend-SAS 112 may suspend all CBSD transmissions that may be considered potentially harmful to dynamic incumbents within a DPA as soon as first frontend-SAS 112 loses connectivity to backend-SAS 104, and may restore such transmissions only when connectivity to backend-SAS 104 is restored. Cloud connection and state handler 206 may handle temporary loss of connectivity between first frontend-SAS 112 and backend-SAS 104 in any of the following approaches described below.

Cloud connection and state handler 206 may prioritize conservative incumbent protection. First frontend-SAS 112 may immediately declare parts of the spectrum being shared as unavailable and work only with what is remaining for its spectrum allocation functionality. For example, when the spectrum being used is CBRS, cloud connection and state handler 206 may engage in DPA protection. In this example, an SAS sensor network may provide its measurement data to backend-SAS 104 and backend-SAS 104 sensor services including the decision logic for declaring DPA active or inactive. Loss of connectivity to backend-SAS 104 may indicate to first frontend-SAS 112 that declaring DPA active for certain geographical areas along the coast may be the best (and most conservative) way to protect DPA incumbents, until connectivity is restored. Slightly less conservative approaches that are optimized in terms of the allocated spectrum are discussed with respect to the hybrid approaches below.

Another approach cloud connection and state handler 206 may employ may involve prioritizing optimized spectral allocation efficiency. In general SAS operations on multiple bands (i.e., not merely CBRS), it may be possible for first frontend-SAS 112 to continue dynamic allocation of spectrum with high spectral allocation efficiency even in the absence of connectivity to backend-SAS 104. In one such approach, first frontend-SAS 112 may continue to operate regardless of incomplete or zero knowledge of dynamic incumbent activity and switch to a more conservative approach only after a predetermined period of time. More advanced approaches are discussed below and may include dynamic incumbent activity prediction and hybrid approaches.

Dynamic incumbent activity prediction is another approach which cloud connection and state handler 206 may employ following loss of connectivity to backend-SAS 104 and may involve leveraging machine learning (ML) based prediction techniques to predict the incumbent activity and continue allocating spectrum using the ML based available spectrum estimates. Similar to prioritizing conservative incumbent protection, upon restoration of connectivity to backend-SAS 104, first frontend-SAS 112 may synchronize backend-SAS 104 with its dynamic incumbent protection activity, as well as switch off its local incumbent DPA protection capability and resume using the dictate from backend-SAS 104.

As another example, cloud connection and state handler 206 may also employ a hybrid approach to the loss of connectivity to backend-SAS 104. First frontend-SAS 112 may be designed with a hybrid approach where a balance may be struck between the approaches outlined above. For example, utilizing an interference headroom approach may involve, in conjunction with or separate from the prediction-based approach described above, first frontend-SAS 112 continuing to operate within some interference headroom, which guarantees that there is from none to limited (yet controlled) interference to dynamic incumbents, that first frontend-SAS 112 has limited knowledge of, when connectivity is lost to backend-SAS 104. An example of a case where first frontend-SAS 112 may have limited knowledge during loss of connectivity to backend-SAS 104 may be when a dynamic incumbent becomes active while first frontend-SAS 112 has no connectivity to backend-SAS 104, and so first frontend-SAS 112 merely has the knowledge that a dynamic incumbent may possibly be active in the area, but does not know for sure.

Monitoring service 208 may be included in first frontend-SAS 112 and may refer to the service responsible for monitoring the health and state of services at first frontend-SAS 112. This monitoring capability may include, but is not limited to, edge infrastructure state and health monitoring, edge application state and health monitoring, collecting and reporting key performance indicators (KPI) and analytics to backend-SAS 104, and raising alerts/alarms when certain configurable performance criteria for the monitored infrastructure and applications are not met. Monitoring service 208 may support APIs which may be used to create GUI dashboards or be made accessible to $3^{rd}$ party (user) management platforms/services.

Software upgrade service 210 may be included in first frontend-SAS 112 and may refer to the service responsible for remote upgrades of all the software services deployed on first frontend-SAS 112. The edge software upgrade may be flexibly performed either independently or in conjunction with an upgrade of backend-SAS 104 software services. This service may handle standard robustness aspects such as roll-back in case of an upgrade failure and may also deliver notifications reporting a success or failure of an upgrade with appropriate indication of status or reason for failure, for example, via reason codes.

Edge db 212 may be included in first frontend-SAS 112 and may refer to one or more databases including data such as, but not limited to, information pertaining to incumbents that the SAS needs to protect, available backend-SAS 104 blocks, move list for DPA operations, alternate channels (to be allocated to CBSDs in the event of DPA activation), information associated with each region, information associated with each user, such as a CBSD, operating in or near each region, first frontend-SAS 112 analytics, and other data which first frontend-SAS 112 may need to operate effectively.

Edge SAS load balancer 214 may be included in first frontend-SAS 112 and may refer to the service responsible for distributing SAS sessions across a cluster of servers. Edge SAS load balancer 214 may add or subtract servers to accommodate changes in peak demand. Further, DNS 215 may refer to a domain name system which may be accessed by first frontend-SAS 112 to connect to CBSD/Domain Proxy 217, e.g., user A network 114 and/or user B network 116.

Edge SAS function 216 may be included in first frontend-SAS 112 and may refer to the SAS functionality of first frontend-SAS 112, such as protocol handling services and/or additional services.

Edge CPAS function 218 may be included in first frontend-SAS 112 and may refer to the function responsible for Coordinated Periodic Activities among SASs (CPAS) of first frontend-SAS 112, that is, the periodic process (e.g., daily) where all SASs synchronize to ensure protection of incumbents.

Edge coexistence function 220 may be included in first frontend-SAS 112 and may refer to the function responsible for discovering and securely connecting to backend-SAS 104.

Edge analytics function 222 may be included in first frontend-SAS 112 and may refer to the function responsible for recording and maintaining data relating to the performance of first frontend-SAS 112.

The first frontend-SAS 112 services and functions described above may be deployed, via automation, either independently or in conjunction with the backend-SAS 104 services in public cloud 102. Consistent with disclosed embodiments, first frontend-SAS 112 may be deployed on edge cloud 110 or local computer resources and backend-SAS 104 may be deployed on public cloud 102. The automation for deployment on these two platforms may be separate or unified. Further, the first frontend-SAS 112 services and functions described above, in full or in part, as well as additional services and functions, may be deployed on second frontend-SAS 122 in any combination thereof.

Edge request router 223 may be included in backend-SAS 104 and may refer to the service responsible for receiving requests from first and second frontend-SASs 112 and 122 and routing such requests to appropriate services or to a different backend-SAS 104 block based on different criteria. This criteria may include, but is not limited to, CBSD-toincumbent mapping and/or block health. In some embodiments, the routing criteria at edge request router 223 may be aligned with the corresponding criteria at multi criteria router 204. Such alignment may be made as part of a SAS frontend/backend configuration and/or via appropriate indicators in the requests from the first and second frontend-SASs 112 and 122.

Backend edge db sync 225 may be included in backend-SAS 104 and may refer to the service responsible for propagating data from backend-SAS 104 to first and second frontend-SASs 112 and 122 as a result of functions centralized SAS function 231, centralized CPAS function 233, centralized coexistence function 235, and centralized analytics function 237. For example, centralized CPAS function 233 may cause backend edge db sync 225 to propagate reconciled CPAS-related results such as new/updated incumbents, alternate channels, and the like.

Edge connection and state handler 227 may be included in backend-SAS 104 and may refer to the service responsible for ensuring robust and reliable connectivity to first and second frontend-SASs 112 and 122. In case there may be a connectivity issue, this service includes re-try and other standard robustness mechanisms to ensure that impact to the first and second frontend-SASs 112 and 122 functionality is minimized. In some embodiments, edge connection and state handler 227 may maintain adequately the state of a CBSD before the connectivity loss in order to make the resumption of connectivity as seamless as possible with respect to CBSD behavior.

In other embodiments, backend-SAS 104 may leverage some CBSD activity prediction or other criteria in order to continue or complete certain SAS functionality even with the loss of connectivity to one or more of first and second frontend-SASs 112 and 122. Additionally or alternatively, if backend-SAS 104 is in the midst of some CBSD-related exchange with one of first and second frontend-SASs 112 and 122 when the connectivity to the frontend-SAS is lost, edge connection and state handler 227 may take appropriate steps, such as restoration of the CBSD state to a known state saved before the connectivity loss, to ensure there is no impact to the overall SAS service or other CBSDs associated with other frontend-SASs. Further, edge connection and state handler 227 may be equipped to resolve conflicts in the state of the CBSDs between backend-SAS 104 and an impacted frontend-SAS, when connectivity to the impacted frontend-SAS is restored.

Mapping db 229 may be included in backend-SAS 104 and may refer to one or more databases including data such as, but not limited to, CBSD-to-incumbent mapping and/or data relating to first and second frontend-SASs 112 and 122.

Centralized SAS function 231 may be included in backend-SAS 104 and may refer to the SAS functionality of first frontend-SAS 112, such as protocol handling services and/or additional services.

Centralized CPAS function 233 may be included in backend-SAS 104 and may refer to the function responsible for Coordinated Periodic Activities among SASs (CPAS) of backend-SAS 104, that is, the periodic process (e.g., daily) where all SASs synchronize to ensure protection of incumbents.

Centralized coexistence function 235 may be included in backend-SAS 104 and may refer to the function responsible for discovering and securely connecting to frontend-SASs, such as first and second frontend-SASs 112 and 122.

Centralized analytics function 237 may be included in backend-SAS 104 and may refer to the function responsible for compiling data relating to the performance of all frontend-SASs backend-SAS 104 may be connected to, such as first and second frontend-SASs 112 and 122.

Figure 3:
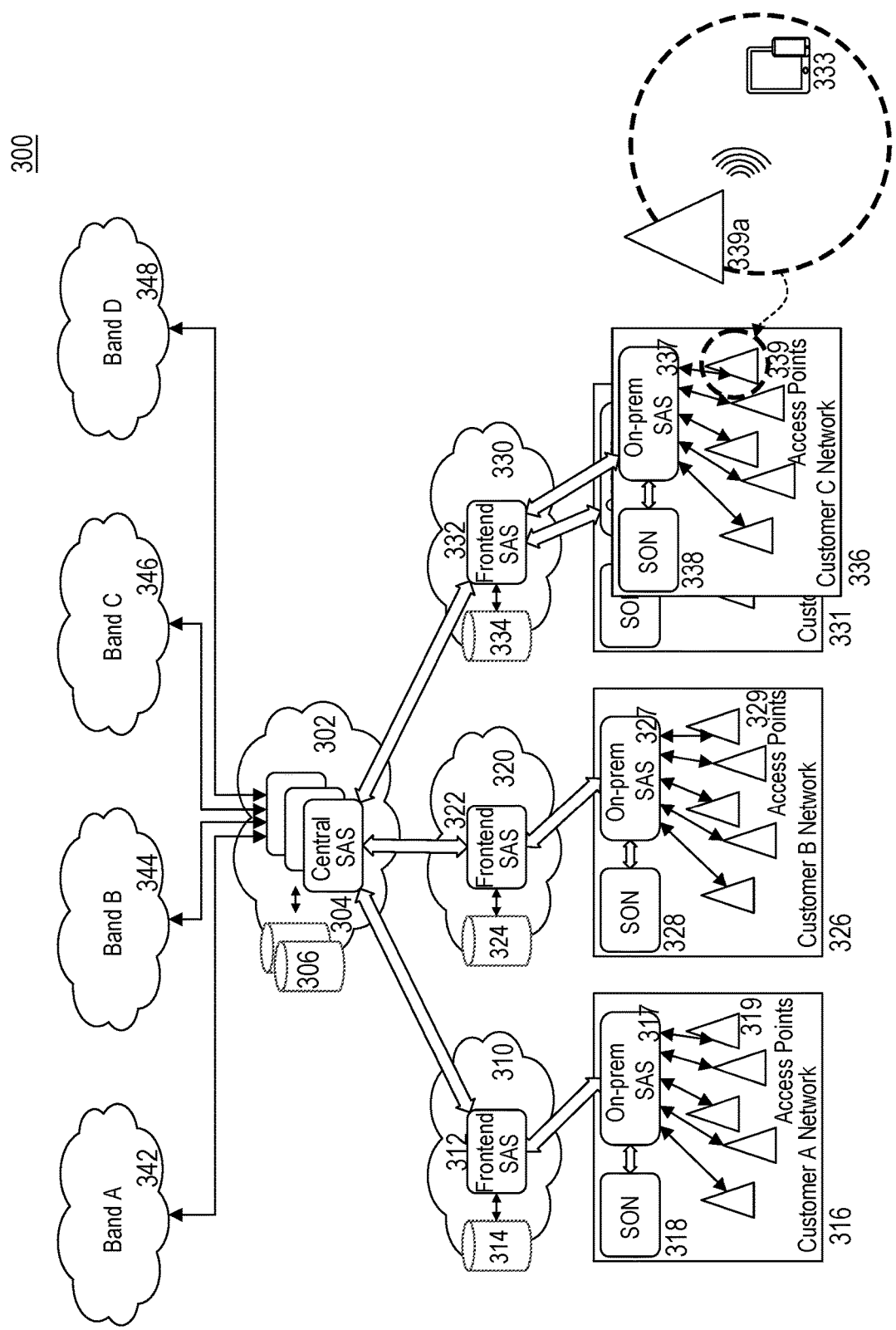
FIG. 3 depicts a schematic diagram of an exemplary multi-tier distributed SAS architecture for a multi-band shared spectrum use-case, consistent with disclosed embodiments.

FIG. 3 depicts a schematic diagram of an exemplary multi-tier distributed SAS architecture for a multi-band shared spectrum use-case in accordance with certain disclosed embodiments. Multi-tier distributed SAS 300 may comprise a variety of computerized and cloud-based systems, each of which may be connected to each other via one or more networks. In some embodiments, each of the elements depicted in FIG. 3 may represent a group of systems, individual systems in a network of systems, functional units or modules inside a system, or any combination thereof. The individual systems may also be located within one geographical location or be geographically dispersed.

In some embodiments, the depicted systems may include a public cloud 302, a backend-SAS 304, a cloud data store 306, a first edge cloud 310, a first frontend-SAS 312, a first edge data store 314, a user A network 316, a first on-premise SAS component 317, first self-organizing network (SON) components 318, first access points 319, a second edge cloud 320, a second frontend-SAS 322, a second edge data store 324, a user B network 326, a second on-premise SAS component 327, second SON components 328, second access points 329, a third edge cloud 330, a user D network 331, a third frontend-SAS 332, a user device 333, a third edge data store 334, a user C network 336, a third on-premise SAS component 337, third SON components 338, and third access points 339. It may be understood that the number of systems, networks, devices, and components depicted in FIG. 3 is only exemplary and fewer or additional systems, networks, devices, and/or components may be implemented.

Each system depicted in FIG. 3 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

Multi-tier distributed SAS 300 is similar to distributed SAS 100, and so are many of the depicted systems, such as public clouds 102 and 302; backend-SASs 104 and 304; edge clouds 110, 120, 310, 320, and 330; frontend-SASs 112, 122, 312, 322, and 332; and user networks 114, 116, 124, 316, 326, and 336. In addition, third frontend-SAS 332 may be connected to two user networks, user C network 336 and user D network 331, much like first frontend-SAS 112 may be connected to two user networks, user A network 114 and user B network 116. However, while distributed SAS 100 includes two 'tiers' where the SAS functionality is split, backend-SAS 104 and first and second frontend-SASs 112 and 122, multi-tier distributed SAS 300 depicts three 'tiers' where the SAS functionality is split, backend-SAS 304, first, second, and third frontend-SASs 312, 322, and 332, and first, second, and third on-premise SASs 317, 327, and 337. While only two and three tiers are depicted in FIG. 1 and FIG. 3, respectively, the number of tiers is only exemplary and additional tiers may be implemented.

In some embodiments, first, second, and third on-premise SASs 317, 327, and 337 may accomplish spectrum allocation tasks that may be computationally light, localized, and may need to be accomplished with stringent low-latency restrictions with respect to access points 319, 329, or 339, respectively. Meanwhile, tasks assigned to SAS components in public cloud 102 (e.g., backend-SAS 304) may be computationally challenging, more regional, and/or focused on spectrum reconciliation in its spectrum-related tasks, and would not necessarily require stringent low-latency restrictions with respect to access points 319, 329, and/or 339, such as providing reconciliation across distributed SAS components, and/or supporting centralized services like analytics, reporting, billing, and other services which may include data from multiple user networks and/or edge clouds. Finally, tasks assigned to SAS components in a nearby 'data-center' (e.g., first, second, and third frontend-SASs 312, 322, and 332) may be more regional, and/or need lower latency with respect to access points 319, 329, or 339.

Another criteria for allocating different spectrum allocation tasks to different tiers may include a determination of the information which is currently available at each tier. For example, first on-premise SAS 317 may be handling spectrum allocation tasks that require real-time network measurements that are verbose and are available close to the networks themselves, such as from first SON components 318. With the advent of 5G Radio Access technologies such as Massive MIMO, such low-latency interactions with first SON components 318 may be useful for effective spectrum allocation. In contrast, first frontend-SAS 312 or backend-SAS 304 may handle higher-level, less urgent information centered around Quality of Service (QoS) policies, revenue-generation policies, content-related policies, and other relevant data.

Multi-tier distributed SAS 300 may utilize multiple bands, such as Band A 342, Band B 344, Band C 346, and Band D 348, where the stakeholders are different, the incentives for sharing spectrum are different, and the revenue generation opportunities for the SAS provider and incumbents are different. For example, different bands which may be supported in SAS may include, but are not limited to, CBRS or the 3.4 GHz-3.55 GHz band or the 6 GHz band in the US. Here, multi-tier SAS architectures may provide the flexibility required to allocate spectrum and meet complex optimization criteria beyond just incumbent protection and interference management. Such additional optimization criteria could include maximizing revenue generation for stakeholders or ensuring certain priorities in terms of which spectrum band is used under what circumstances, Cloud data store 306, in some embodiments, may be configured to store data required by backend-SAS 304, such as, but not limited to, information pertaining to incumbents that the SAS needs to protect, available backend-SAS 304 blocks, move list for DPA operations, alternate channels (to be allocated to CBSDs in the event of DPA activation), information associated with each region, information associated with each user, such as a CBSD, operating in or near each region, analytics associated with first, second, and third frontend-SASs 312, 322, and 332, spectrum-related QoS policies, revenue-generation policies, content-related policies, and other data which backend-SAS 304 may need to operate effectively.

First, second, and third edge data stores 314, 324, and 334, in some embodiments, may be configured to store data required by first, second, and third frontend-SASs 312, 322, and 332, respectively. For example, first edge data store 314 may contain data such as, but not limited to, information pertaining to incumbents that the SAS needs to protect, available backend-SAS 304 blocks, move list for DPA operations, alternate channels (to be allocated to CBSDs in the event of DPA activation), information associated with each region, information associated with each user, such as a CBSD, operating in or near each region, first frontend-SAS 112 analytics, and other data which first frontend-SAS 112 may need to operate effectively.

First, second, and third on-premise SASs 317, 327, and 337, in some embodiments, may include one or more processors with access to mapping databases and may be configured to handle certain SAS functions involving localized computations which need to react with extremely low latency to measurements from access points 319, 329, or 339, respectively.

First, second, and third SON components 318, 328, and 338, in some embodiments, may include network elements which allow for the planning, configuration, management, optimization, and healing of mobile radio access networks to be more efficient. For example, first SON components 318 may interact with first on-premise SAS 317 to assist with spectrum allocation tasks which typically will require low latency.

First, second, and third access points 319, 329, and 339, in some embodiments, may include SAS clients and may allow for user or end devices with SAS client functionality to connect to the access points 319, 329, and 339. For example, as shown in FIG. 3, access point 339a, which includes an SAS client, may be connected to user device 333, which includes SAS client functionality. User device 333, in some embodiments, may be a personal computing device including, but not limited to, a smartphone, a laptop or notebook computer, a tablet, a multifunctional watch, a pair of multifunctional glasses, any mobile or wearable device with computing ability, or any combination of these computers and/or affiliated components.

Figure 4:
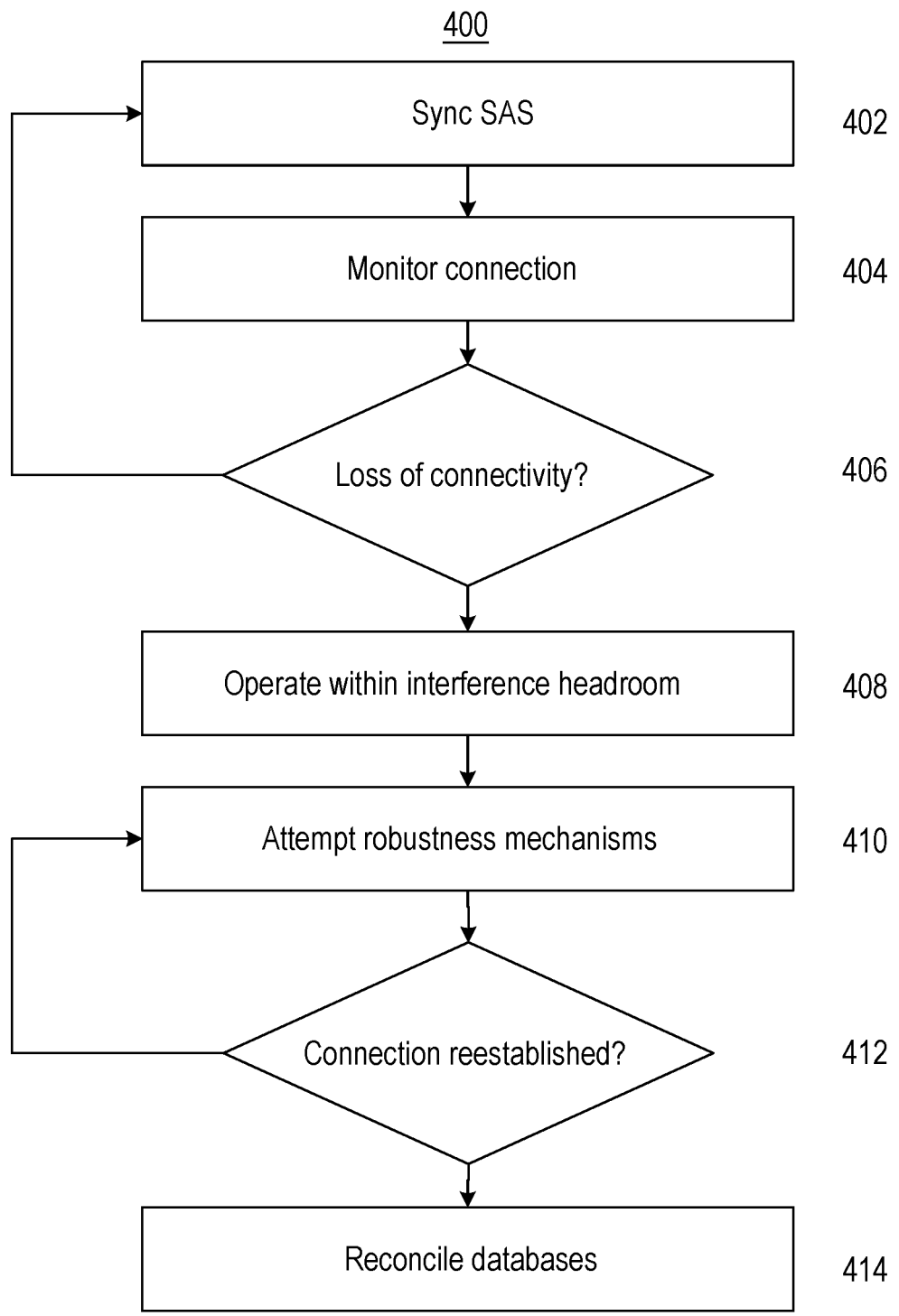
FIG. 4 depicts a flowchart illustrating an exemplary method for maintaining a distributed backend-SAS, consistent with disclosed embodiments.

FIG. 4 is a flowchart illustrating an exemplary method for maintaining a distributed cloud SAS in accordance with certain disclosed embodiments. Method 400 may be implemented utilizing any cloud-based system or subsystem as described above, including distributed SAS 100, multi-tier distributed SAS 300, and/or any element thereof. Method 400 is described below with reference to the networked systems of FIG. 1 and FIG. 2, but any other configuration of systems, subsystems, or modules may be used to perform method 400.

At step 402, the cloud-based system may sync one or more frontend databases at a frontend-SAS with corresponding backend databases at a backend-SAS. For example, edge connection and state handler 227 may maintain adequately the state of the CBSD before the connectivity loss in order to make the resumption of connectivity as seamless as possible with respect to CBSD behavior. Additionally or alternatively, frontend and backend edge db syncs 204 and 225 may interact with each other to sync one or more edge db 212 at first frontend-SAS 112 with corresponding mapping db 229 at backend-SAS 104.

At step 404, the cloud-based system may monitor a connection between the frontend-SAS and the backend-SAS. For example, monitoring service 208 may monitor the health and state of services at first frontend-SAS 112. This monitoring capability may include, but is not limited to, edge infrastructure state and health monitoring, edge application state and health monitoring, collecting and reporting key performance indicators (KPI) and analytics to backend-SAS 104, and raising alerts/alarms when certain configurable performance criteria for the monitored infrastructure and applications are not met. Monitoring service 208 may support APIs which may be used to create GUI dashboards or be made accessible to $3^{rd}$ party (user) management platforms/services.

At step 406, the cloud-based system may determine whether the connection between the frontend-SAS and the backend-SAS has been severed. For example, monitoring service 208 may detect a loss of connectivity when certain configurable performance criteria for the monitored infrastructure and applications are not met. If monitoring service 208 raises an alert because these criteria are not met, method 400 may proceed to step 408. However, if monitoring service 208 determines that the criteria are met, method 400 may return to step 402.

At step 408, the cloud-based system may continue to operate within an interference headroom, wherein the interference headroom guarantees there is none to limited interference to dynamic incumbents. For example, cloud connection and state handler 206 may employ a hybrid approach to the loss of connectivity to backend-SAS 104 where first frontend-SAS 112 may continue to operate within some interference headroom which guarantees that there is from none to limited (yet controlled) interference to dynamic incumbents, that first frontend-SAS 112 has limited knowledge of, when connectivity is lost to backend-SAS 104.

At step 410, the cloud-based system may attempt one or more robustness mechanisms to ensure impact to the frontend-SAS is minimized and to reestablish the connection between the frontend-SAS and the backend-SAS. For example, cloud connection and state handler 206 may perform re-try and other standard robustness mechanisms to ensure that impact to first frontend-SAS 112 functionality is minimized. In some embodiments, first frontend-SAS 112 may suspend all CBSD transmissions that may be considered potentially harmful to dynamic incumbents such as DPA in CBRS as soon as first frontend-SAS 112 loses connectivity to backend-SAS 104, and may restore such transmissions only when connectivity to backend-SAS 104 is restored.

At step 412, the cloud-based system may determine whether the connection is reestablished. For example, monitoring service 208 may continue to monitor the health and state of services at first frontend-SAS 112, including monitoring the certain configurable performance criteria for the monitored infrastructure and applications which were not met at step 406. When monitoring service 208 determines that the criteria are met, distributed SAS 100 may determine the connection to be reestablished, and method 400 may proceed to step 414. However, if the connection is not reestablished, method 400 may return to step 410. In some embodiments, monitoring service 208 may track a number of times cloud connection and state handler 206 has attempted to restore connectivity between first frontend-SAS 112 and backend-SAS 104. If monitoring service 208 determines that the number of times exceeds a threshold, backend-SAS 104 may determine that first frontend-SAS 112 requires a different process for restoring connectivity, for example, a manual restart. In other embodiments, there is no such threshold and the loop of steps 410 and 412 may continue infinitely until connectivity is restored or there is manual intervention or intervention by another system.

At step 414, the cloud-based system may reconcile the one or more frontend databases at the frontend-SAS with the corresponding backend databases at the backend-SAS. For example, frontend and backend edge db syncs 204 and 225 may interact with each other to reconcile one or more edge db 212 at first frontend-SAS 112 with corresponding mapping db 229 at backend-SAS 104. If edge connection and state handler was operating correctly before the loss of connectivity, the state of the CBSD before the connectivity loss would have been appropriately saved at public cloud 102 and the resumption of connectivity may be as seamless as possible with respect to CBSD behavior. In some embodiments, following step 414, method 400 may return to step 402. In other embodiments, method 400 may conclude following step 414.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the Application. The examples are to be construed as non-exclusive. Furthermore, the steps of the disclosed routines may be modified in any manner, including by reordering steps, performing steps in parallel, and/or inserting or deleting steps. It is intended, therefore, that the specification and examples be considered as illustrative only, with a true scope and spirit being indicated by the following claims and their full scope of equivalents.

What is claimed is:

1. A cloud-based method for maintaining a distributed cloud spectrum access system (SAS), the method comprising:
   syncing one or more frontend databases at a frontend-SAS with corresponding backend databases at a backend-SAS;
   monitoring a connection between the frontend-SAS and the backend-SAS;
   determining the connection between the frontend-SAS and the backend-SAS has been severed;
   continuing to operate the frontend-SAS within an interference headroom, wherein operation within the margin of an interference headroom guarantees there is controlled interference to dynamic incumbents on the same frequency by decreasing one or more transmissions that are potentially harmful to dynamic incumbents once the connection is severed;
   performing one or more robustness mechanisms to reestablish the connection between the frontend-SAS and the backend-SAS and to minimize impact to the frontend-SAS; and
   upon determining the connection is reestablished, reconciling the one or more frontend databases at the frontend-SAS with the corresponding backend databases at the backend-SAS.

2. The method of claim 1, further comprising:
   monitoring one or more services at the frontend-SAS;
   determining whether a performance criteria for the one or more services is met; and
   raising an alert when the performance criteria for at least one of the one or more services is not met.

3. The method of claim 2, wherein monitoring one or more services at the frontend-SAS comprises one or more of edge infrastructure state and health monitoring, edge application state and health monitoring, collecting key performance indicators and analytics.

4. The method of claim 2, further comprising providing a user device with data related to the monitored one or more services.

5. The method of claim 1, wherein the frontend-SAS is configured to connect to a predetermined user device.

6. The method of claim 1, wherein the frontend-SAS is configured to connect to one or more user devices based on their physical proximity to the frontend-SAS.

7. The method of claim 1, wherein the frontend-SAS is configured to connect to one or more devices of a particular user and supports one or more SASs.

8. The method of claim 1, wherein the frontend-SAS is configured to deploy different versions of the SAS functionality as required.

9. The method of claim 1, wherein the frontend-SAS is configured to support public and private SASs.

10. The method of claim 1, further comprising:
detecting the frontend-SAS has been compromised; and
isolating the frontend-SAS from the backend-SAS until the frontend-SAS is no longer compromised.

11. The method of claim 1, wherein the distributed cloud SAS comprises a multi-tier architecture.

12. The method of claim 1, wherein the one or more databases at the frontend-SAS store data comprising one or more of information pertaining to incumbents, available backend-SAS blocks, a move list for Dynamic Protection Area (DPA) operations, or alternate channels.

13. The method of claim 1, further comprising routing requests asynchronously from the frontend-SAS to a most appropriate backend-SAS block utilizing a combination of criteria, the criteria comprising CBSD-to-incumbent mapping, block health, closest backend-SAS block in terms of geographical or network distance, least loaded backend-SAS block, backend-SAS block which has an extended capability.

14. The method of claim 13, wherein the extended capability is chosen from a list comprising advanced planning services, tighter integration with a packet core or connectivity services, 5G-oriented capabilities, and New Radio.

15. The method of claim 1, further comprising:
determining potentially harmful CBSD transmissions to the dynamic incumbents; and
suspending the potentially harmful CBSD transmissions until the connection is reestablished.

16. The method of claim 1, further comprising:
predicting an activity of the dynamic incumbents by utilizing machine learning techniques; and
allocating spectrum provided by the frontend-SAS based on the prediction.

17. The method of claim 1, wherein the frontend-SAS is configured to perform one or more of:
terminating SAS protocol exchanges with user devices,
routing requests over an interface to the backend-SAS based on criteria,
handling alternate channel allocation upon DPA activation, and
maintaining and accessing a relevant mapping to cloud data.

18. The method of claim 1, wherein the backend-SAS is configured to perform one or more of:
handling requests from the frontend-SAS,
routing responses back to the frontend-SAS,
discovering and securely establishing a connection to the frontend-SAS,
maintaining data related to the frontend-SAS, or
storing a present state of the frontend-SAS.

19. A cloud-based system for maintaining a distributed cloud spectrum access system (SAS), the system comprising:
one or more processors; and
a memory storing instructions that, when executed by the one or more processors, cause the one or more processors to perform the steps comprising:
syncing one or more edge databases at a frontend-SAS with corresponding cloud databases at a backend-SAS;
monitoring a connection between the frontend-SAS and the backend-SAS;
determining the connection between the frontend-SAS and the backend-SAS has been severed;
continuing to operate the frontend-SAS within an interference headroom, wherein operation within the margin of an interference headroom guarantees there is controlled interference to dynamic incumbents on the same frequency by decreasing one or more transmissions that are potentially harmful to dynamic incumbents once the connection is severed;
performing one or more robustness mechanisms to reestablish the connection between the frontend-SAS and the backend-SAS and to minimize impact to the frontend-SAS; and
upon determining the connection is reestablished, reconciling the one or more edge databases at the frontend-SAS with the corresponding cloud databases at the backend-SAS.

20. The system of claim 19, the steps further comprising:
monitoring one or more services at the frontend-SAS;
determining whether a performance criteria for the one or more services is met; and
raising an alert when the performance criteria for at least one of the one or more services is not met.

21. The system of claim 20, wherein monitoring one or more services at the frontend-SAS comprises one or more of edge infrastructure state and health monitoring, edge application state and health monitoring, collecting key performance indicators and analytics.

22. The system of claim 20, the steps further comprising providing a user device with data related to the monitored one or more services.

23. The system of claim 19, wherein the frontend-SAS is configured to connect to a predetermined user device.

24. The system of claim 19, wherein the frontend-SAS is configured to connect to one or more user devices based on their physical proximity to the frontend-SAS.

25. The system of claim 19, wherein the frontend-SAS is configured to connect to one or more devices of a particular user and supports one or more SASs.

26. The system of claim 19, wherein the frontend-SAS is configured to deploy different versions of the SAS functionality as required.

27. The system of claim 19, wherein the frontend-SAS is configured to support public and private SASs.

28. The system of claim 19, further comprising:
detecting the frontend-SAS has been compromised; and
isolating the frontend-SAS from the backend-SAS until the frontend-SAS is no longer compromised.

29. The system of claim 19, wherein the distributed cloud SAS comprises a multi-tier architecture.

30. The system of claim 19, wherein the one or more databases at the frontend-SAS store data comprising one or more of information pertaining to incumbents, available backend-SAS blocks, a move list for Dynamic Protection Area (DPA) operations, or alternate channels.

31. The system of claim 19, the steps further comprising routing requests asynchronously from the frontend-SAS to a most appropriate backend-SAS block utilizing a combination of criteria, the criteria comprising CBSD-to-incumbent mapping, block health, closest backend-SAS block in terms of geographical or network distance, least loaded backend-SAS block, backend-SAS block which has an extended capability.

32. The system of claim 31, wherein the extended capability is chosen from a list comprising advanced planning services, tighter integration with a packet core or connectivity services, 5G-oriented capabilities, and New Radio.

33. The system of claim 19, the steps further comprising:
   determining potentially harmful CBSD transmissions to the dynamic incumbents; and
   suspending the potentially harmful CBSD transmissions until the connection is reestablished.

34. The system of claim 19, the steps further comprising:
   predicting an activity of the dynamic incumbents by utilizing machine learning techniques; and
   allocating spectrum provided by the frontend-SAS based on the prediction.

35. The system of claim 19, wherein the frontend-SAS is configured to perform one or more of:
   terminating SAS protocol exchanges with user devices,
   routing requests over an interface to the backend-SAS based on criteria,
   handling alternate channel allocation upon DPA activation, and
   maintaining and accessing a relevant mapping to cloud data.

36. The system of claim 19, wherein the backend-SAS is configured to perform one or more of:
   handling requests from the frontend-SAS,
   routing responses back to the frontend-SAS,
   discovering and securely establishing a connection to the frontend-SAS,
   maintaining data related to the frontend-SAS, or
   storing a present state of the frontend-SAS.

37. A non-transitory computer-readable medium embodying program code for maintaining a distributed cloud spectrum access system (SAS), the program code comprising a set of instructions, stored on the computer readable medium, that when executed by a processor, cause the processor to perform the operations of:
   syncing one or more edge databases at a frontend-SAS with corresponding cloud databases at a backend-SAS;
   monitoring a connection between the frontend-SAS and the backend-SAS;
   determining the connection between the frontend-SAS and the backend-SAS has been severed;
   continuing to operate the frontend-SAS within an interference headroom, wherein operation within the margin of an interference headroom guarantees there is controlled interference to dynamic incumbents on the same frequency by decreasinq one or more transmissions that are potentially harmful to dynamic incumbents once the connection is severed;
   performing one or more robustness mechanisms to reestablish the connection between the frontend-SAS and the backend-SAS and to minimize impact to the frontend-SAS; and
   upon determining the connection is reestablished, reconciling the one or more edge databases at the frontend-SAS with the corresponding cloud databases at the backend-SAS.

* * * * *

UNITED STATES PATENT AND TRADEMARK OFFICE
CERTIFICATE OF CORRECTION

PATENT NO. : 12,328,362 B2
APPLICATION NO. : 17/176701
DATED : June 10, 2025
INVENTOR(S) : Deepak Das et al.

Page 1 of 1

It is certified that error appears in the above-identified patent and that said Letters Patent is hereby corrected as shown below:

In the Claims

Claim 37, Column 20, Line 20, "decreasinq" should read as --decreasing--.

Signed and Sealed this
Twenty-sixth Day of August, 2025

Coke Morgan Stewart
*Acting Director of the United States Patent and Trademark Office*